(12) United States Patent
Kobayashi et al.

(10) Patent No.: US 7,532,466 B2
(45) Date of Patent: May 12, 2009

(54) EXTENSION UNIT FOR ELECTRONIC APPARATUS

(75) Inventors: Sonomasa Kobayashi, Kawasaki (JP); Yusuke Mizuno, Kawasaki (JP); Kaigo Tanaka, Kawasaki (JP); Yukihiro Ueki, Tokyo (JP); Minoru Suzuki, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 61 days.

(21) Appl. No.: 11/976,765

(22) Filed: Oct. 26, 2007

(65) Prior Publication Data

US 2008/0055844 A1    Mar. 6, 2008

Related U.S. Application Data

(63) Continuation of application No. PCT/JP2005/008079, filed on Apr. 27, 2005.

(51) Int. Cl.
*G06F 1/16* (2006.01)

(52) U.S. Cl. ............... 361/686; 710/303; 455/575.1; 361/679.41

(58) Field of Classification Search ............. 455/575.1; 439/352, 552, 752; 324/755, 771; 312/221.1–221.2; 710/303; 361/679.01–679.02, 679.41, 679.45
See application file for complete search history.

(56) References Cited

U.S. PATENT DOCUMENTS

| | | | |
|---|---|---|---|
| 6,115,246 A | 9/2000 | Ohnishi | |
| 6,149,473 A * | 11/2000 | Lalange et al. | 439/752 |
| 6,233,145 B1 | 5/2001 | Ohnishi | |
| 6,556,436 B2 | 4/2003 | Ohnishi | |
| 6,560,103 B1 | 5/2003 | Dohi et al. | |
| 7,280,854 B2 * | 10/2007 | Sugawara et al. | 455/575.1 |
| 2001/0009502 A1 | 7/2001 | Ohnishi | |
| 2008/0100995 A1 * | 5/2008 | Ryder et al. | 361/679 |

FOREIGN PATENT DOCUMENTS

| | | |
|---|---|---|
| EP | 0840540 | 5/1998 |
| EP | 1380919 | 1/2004 |
| EP | 1380920 | 1/2004 |

(Continued)

OTHER PUBLICATIONS

English language version of the International Search Report (PCT/ISA/210) mailed on Jul. 26, 2007 in connection with the International Application No. PCT/JP2005/008079.

*Primary Examiner*—Hung V Duong
(74) *Attorney, Agent, or Firm*—Staas & Halsey LLP (57) ABSTRACT

An electronic apparatus is received on the front surface of an enclosure. A connector is connected to the electronic apparatus. When the electronic apparatus is to be demounted, an operating body is pulled out from a retract position toward a pulled-out position. A movable member moves from a first position to a second position. The movable member at the second position serves to protrude lifting members out of the front surface of the enclosure, so that the lifting members urge the electronic apparatus upward. The connector is disconnected from the electronic apparatus. The movable member allows the movement of the operating body from the pulled-out position to the retract position while the movable member stays at the second position. The operating body returns to the retract position while the disconnection is maintained between the connector and the electronic apparatus.

6 Claims, 11 Drawing Sheets

FOREIGN PATENT DOCUMENTS

| | | |
|---|---|---|
| EP | 1380921 | 1/2004 |
| EP | 1780623 | 5/2007 |
| JP | 6-83484 | 3/1994 |
| JP | 2000-99201 | 4/2000 |
| JP | 2000-194447 | 7/2000 |
| JP | 2001-306180 | 11/2000 |
| JP | 3248712 | 11/2001 |

* cited by examiner

EXTENSION UNIT FOR ELECTRONIC APPARATUS

CROSS REFERENCE TO RELATED APPLICATION

This application is a continuing application, filed under 35 U.S.C. §111(a), of International Application PCT/JP2005/008079, filed Apr. 27, 2005, the entire contents of which are incorporated herein by reference.

BACKGROUND OF THE INVENTION

1. Field of the Invention:

The present invention relates to an extension unit coupled to an electronic apparatus such as a notebook personal computer, for example.

2. Description of the Prior Art:

An extension unit, such as a port replicator or a docking station, for a notebook personal computer is well known. A notebook personal computer is received on the surface of such an extension unit. In this case, a connector is disposed on the surface of the extension unit. This connector is connected to a connector of the notebook personal computer. The extension unit enables connection of various kinds of peripheral devices to the notebook personal computer.

The extension unit includes a lifting member capable of protruding out of the surface of the extension unit. The lifting member is designed to move in the vertical direction between an enclosed position and a protruding position. The lifting member is enclosed in the enclosure of the extension unit when the lifting member reaches the enclosed position. The lifting member protrudes out of the surface of the enclosure when the lifting member reaches the protruding position. The lifting member is coupled to an operating lever placed in the side surface of the enclosure, for example. The operation of the operating lever realizes the vertical movement of the lifting member.

While the notebook personal computer is mounted on the extension unit, an operator pulls out the operating lever in the extension unit. The lifting member thus protrudes out of the surface of the enclosure. The lifting member moves from the enclosed position to the protruding position. The lifting member urges the bottom of the notebook personal computer upward. This results in disconnection between the connectors.

In this case, the lifting member has to stay at the protruding member. The operating lever correspondingly has to stay out of the enclosure of the extension unit. When the operator lifts the notebook personal computer, for example, the power cord of the notebook personal computer is sometimes caught at the operating lever. This is supposed to result in a fall of the extension unit from the top of the desk to the floor, for example. The extension unit can be damaged.

SUMMARY OF THE INVENTION

It is accordingly an object of the present invention to provide an extension unit, designed for an electronic apparatus, allowing less possibility of damage.

According to a first aspect of the present invention, there is provided an extension unit for an electronic apparatus, comprising: an enclosure defining a surface receiving an electronic apparatus; a connector placed in the surface of the enclosure for connection to the electronic apparatus; an operating body coupled to the enclosure for relative movement between a retract position and a pulled-out position, the operating body retracting inside the enclosure when the operating body is set at the retract position, the operating body pulled out of the enclosure when the operating body is set at the pulled-out position; and an interlocking mechanism enabling withdrawal of a lifting member into the enclosure when the operating body is set at the retract position, the interlocking mechanism enabling protrusion of the lifting member out of the surface of the enclosure to urge the electronic apparatus upward based on movement of the operating body from the retract position toward the pulled-out position, wherein the interlocking mechanism allows movement of the operating body from the pulled-out position to the retract position while keeping the lifting member protruding out of the surface of the enclosure.

When an electronic apparatus is mounted on the extension unit, the electronic apparatus is received on the surface of the enclosure. The connector is connected to the electronic apparatus. The user of the electronic apparatus is allowed to utilize various kinds of peripheral devices through the extension unit, for example. When the services of the extension unit have been completed, the operating body is pulled out from the retract position to the pulled-out position for removing the electronic apparatus. The interlocking mechanism enables protrusion of the lifting member out of the surface of the enclosure. The lifting member urges the electronic apparatus upward. This results in disconnection between the connector and the electronic apparatus.

In this case, the interlocking mechanism serves to keep the lifting member protruding out of the surface of the enclosure. The lifting member thus enables continuation of the disconnection between the connector and the electronic apparatus. The operating body is allowed to move from the pulled-out position to the retract position. The operating body is thus allowed to reach the retract position while the connector and the electronic apparatus are kept disconnected. When the electronic apparatus is lifted off, for example, a wire or wires of the electronic apparatus is prevented from engagement with the operating body, for example. This serves to reliably prevent the extension unit from a fall resulting from engagement of the wire with the operating body. The extension unit can be prevented from getting damaged.

According to a second aspect of the present invention, there is provided an extension unit, comprising: an enclosure defining a surface receiving an electronic apparatus; a connector placed in the surface of the enclosure for connection to the electronic apparatus; an operating body coupled to the enclosure for relative movement between a retract position and a pulled-out position, the operating body retracting inside the enclosure when the operating body is set at the retract position, the operating body pulled out of the enclosure when the operating body is set at the pulled-out position; a movable member coupled to the operating body, the movable member designed to move from a first position toward a second position in response to the movement of the operating body from the retract position toward the pulled-out position; and a lifting member retracting inside the enclosure when the movable member is set at the first position, the lifting member protruding from the surface of the enclosure to urge the electronic apparatus upward when the movable member is set at the second position, wherein the movable member allows the movement of the operating body from the pulled-out position to the retract position while the movable member is kept at the second position.

When an electronic apparatus is mounted on the extension unit, the electronic apparatus is received on the surface of the enclosure. The connector is connected to the electronic apparatus. The user of the electronic apparatus is allowed to utilize various kinds of peripheral devices through the extension unit, for example. When the services have been completed, the operating body is pulled out from the retract position to the pulled-out position for removing the electronic apparatus. The interlocking mechanism enables protrusion of the lifting member out of the surface of the enclosure. The lifting member urges the electronic apparatus upward. This results in disconnection between the connector and the electronic apparatus.

In this case, the movable member is kept at the second position. The lifting member keeps protruding out of the surface of the enclosure. The lifting member serves to keep disconnection between the connector and the electronic apparatus. The movable member allows the operating body to move from the pulled-out position to the retract position while the movable member is kept at the second position. The operating body is thus allowed to reach the retract position while the connector and the electronic apparatus are kept disconnected in the same manner as described above.

The extension unit may further comprise a coupling member coupled to the operating body at a position distanced from a rotation axis of the operating body, the coupling member designed to hold a pin movable within a guiding groove defined in one end of the movable member. The operating body is allowed to move from the pulled-out position to the retract position in a facilitated manner even when the movable member is kept at the second position.

The extension unit may further comprise: a flat surface defined on the movable member, the flat surface receiving the movement of the lifting member in the direction of gravity when the movable member is set at the second position; and an elastic member exhibiting a driving force enabling the movement of the movable member from the second position to the first position. In this case, when the weight of the electronic apparatus is applied to the elastic member through the lifting member, the movable member is kept at the second position against the driving force of the elastic member.

When the movable unit is set at the second position in the extension unit, the lifting member protrudes out of the surface of the enclosure in the same manner as described above. The lifting member receives the electronic apparatus. The weight of the electronic apparatus is applied to the movable member through the lifting member. When the movable member is set at the second position, the movement of the lifting member in the direction of gravity is received on the flat surface of the movable member. The weight of the electronic apparatus serves to keep the movable member at the second position irrespective of the driving force of the elastic member. Even when the operating body returns to the retract position from the pulled-out position, the lifting member is kept protruding out of the surface of the enclosure. The disconnection is thus maintained between the connector and the electronic apparatus. This results in a reliable prevention of an accidental connection between the connector and the electronic apparatus after the disconnection.

In this case, when the electronic apparatus is lifted off, the lifting member is released from the weight of the electronic apparatus. The driving force of the elastic member forces the movable member to move from the second position to the first position. When the movable member returns to the first position, the lifting member retracts inside the enclosure. The extension unit is brought into the original condition in this manner.

The extension unit may further comprise a driving source exhibiting a driving force enabling the movement of the operating body from the pulled-out position toward the retract position. The user of the extension unit pulls out the operating body with his finger when the electronic apparatus is to be demounted from the extension unit, for example. When the finger is disengaged from the operating body, the driving source enables the movement of the operating body from the pulled-out position to the retract position. A wire or wires of the electronic apparatus is prevented from engagement with the operating body. This serves to reliably prevent the extension unit from a fall resulting from engagement of the wire with the operating body. The extension unit can be prevented from getting damaged.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
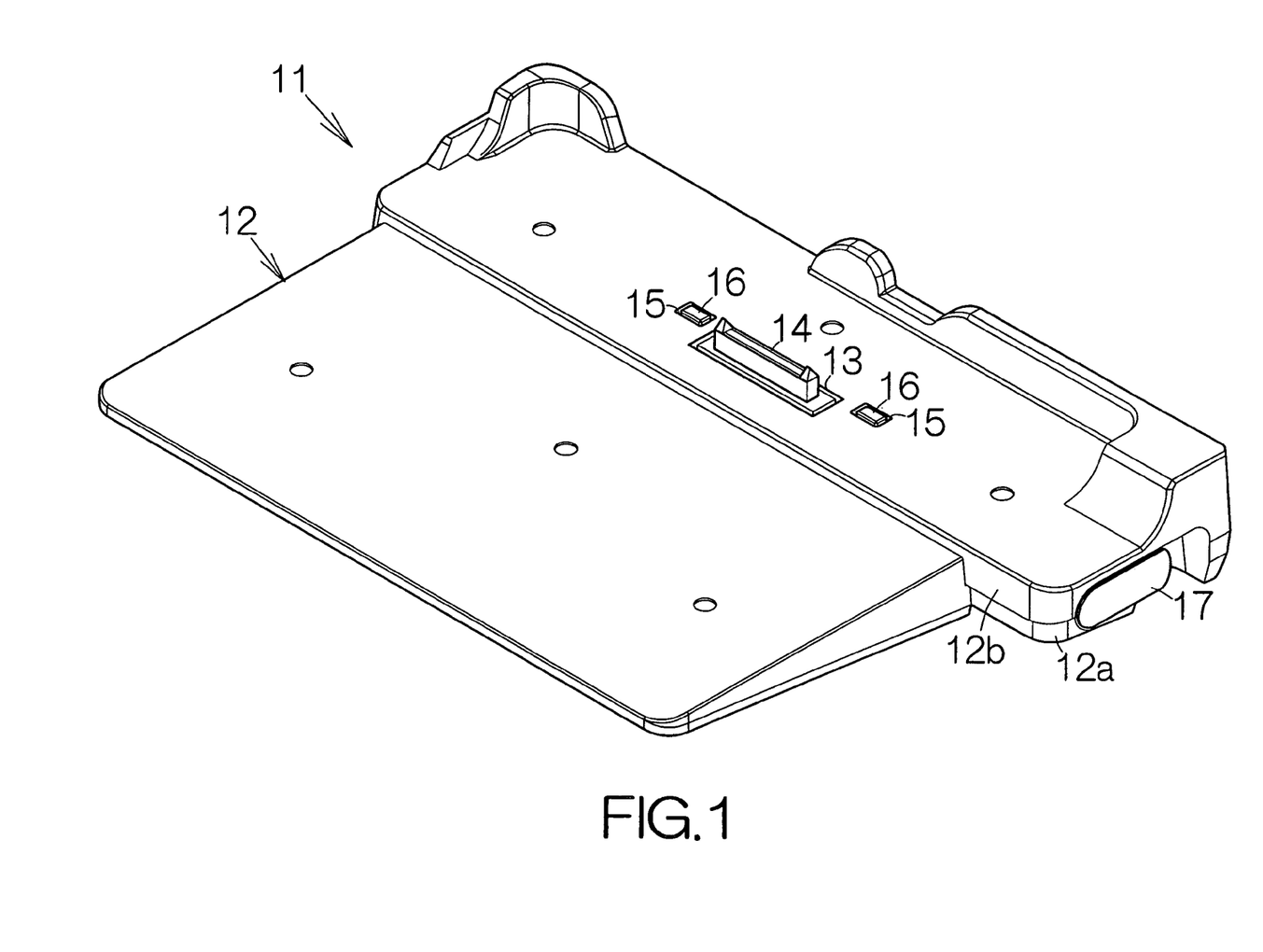
FIG. 1 is a perspective view schematically illustrating an extension unit according to an embodiment of the present invention.

FIG. 1 schematically illustrates an extension unit 11 for an electronic apparatus according to the present invention. The extension unit 11 includes an enclosure 12. The enclosure 12 includes a base 12a and a cover 12b coupled to the base 12a. The cover 12b defines a front surface intersecting with a horizontal plane by a predetermined inclination angle, for example. An electronic apparatus such as a notebook personal computer is received on the front surface of the cover 12b, for example. The enclosure 12 may be made of a reinforced resin material such as polycarbonate, for example.

The extension unit 11 includes a connector 14 protruding from an opening 13 defined in the front surface of the cover 12b. The extension unit 11 also includes lifting members 16, 16 placed within openings 15, 15 defined in the surface of the cover 12b. Each of the lifting members 16, 16 is designed to move in the vertical direction intersecting with the surface of the enclosure 12 between an enclosed position and a protruding position as described later in detail. The lifting member 16 retracts from the front surface of the cover 12b when the lifting member 16 assumes the enclosed position. The lifting member 16 protrudes out of the surface of the cover 12b when the lifting member 16 assumes the protruding position.

An operating body, namely an operating lever 17, is disposed in the side surface of the enclosure 12. The operating lever 17 is coupled to the enclosure 12 for relative movement between a retract position and a pulled-out position as described later. The operating lever 17 retracts inside the enclosure 12 when the operating lever 17 reaches the retract position. The operating lever 17 is pulled out of the enclosure 12 when the operating lever 17 assumes the pulled-out position. The operating lever 17 is connected to the lifting members 16, 16 inside the enclosure 12. The movement of the lifting members 16, 16 is thus related to the movement of the operating lever 17.

Connectors such as a universal serial bus (USB) connector, a cathode-ray tube (CRT) connector, an LAN (Local Area Network) connector, an alternating current (AC) connector, and the like, not shown, are disposed in the rear end of the enclosure 12. Such connectors enable the connection of peripheral devices such as a mouse, a keyboard, a projector, a CRT display unit, a printer, and the like, to the extension unit 11. The extension unit 11 in this manner functions as a so-called port replicator or a so-called docking station.

Figure 2:
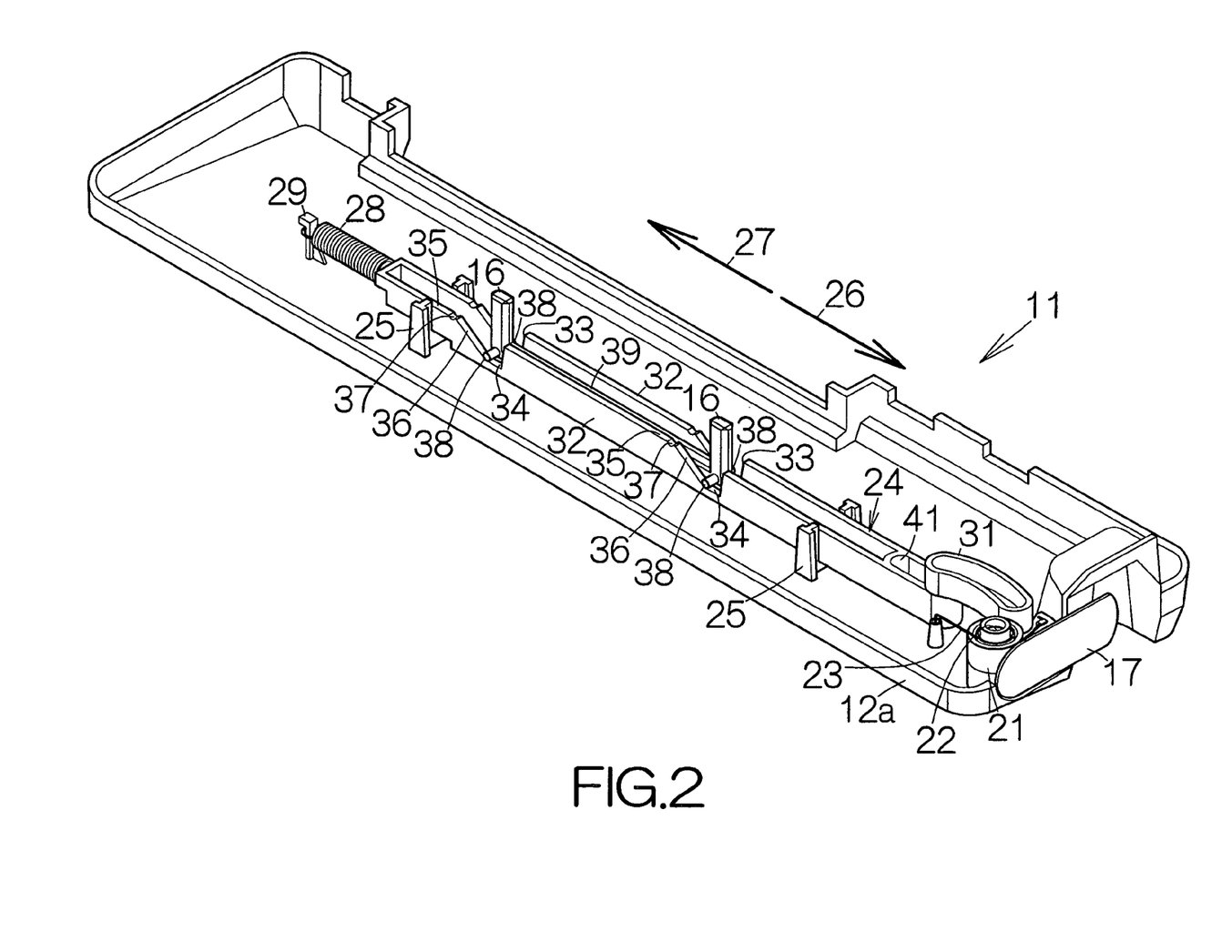
FIG. 2 is a perspective view schematically illustrating the inner structure of the extension unit.

As shown in FIG. 2, a rotating member 21 is placed within the inner space of the base 12a. The rotating member 21 is integral with the operating lever 17. The rotating member 21 is supported on a support shaft 22 standing upright from the bottom of the base 12a for relative rotation. The support shaft 22 may be integral with the base 12a. The operating lever 17 is thus coupled to the support shaft 22 for relative swinging movement. A torsion coil spring 23 is coupled to the rotating member 21. The torsion coil spring 23 serves as a driving source for the operating lever 17. The torsion coil spring 23 exhibits a driving force around the longitudinal axis of the coil in a conventional manner. Such a driving force allows the swinging movement of the operating lever 17 from the pulled-out position to the retract position.

An elongated movable member 24 is also placed within the inner space of the base 12a. The movable member 24 is designed to extend straight in a predetermined direction. The movable member 24 is received on a pair of guiding members 25, 25 standing upright from the bottom of the base 12a. The guiding members 25, 25 may be integral with the base 12a. The movable member 24 is allowed to move in a first direction 26 and in a second direction 27 opposite to the first direction based on the guide of the guiding members 25, 25. When the movable member 24 moves in the first direction 26, the movable member 24 approaches the operating lever 17. When the movable member 24 moves in the second direction, the movable member 24 gets remote from the operating lever 17. The movable member 24 serves as an interlocking mechanism according to the present invention.

One end of an elastic member, namely a compressive coil spring 28, is connected to one end of the movable member 24. The other end of the compressive coil spring 28 is connected to a columnar member 29 standing upright from the bottom of the base 12a. The columnar member 29 may be integral with the base 12a. The compressive coil spring 28 applies a driving force or compressive force to the movable member 24 in the second direction 27. The compressive force of the compressive coil spring 28 allows the movable member 24 to move in the second direction with the assistance of the guide of the guiding members 25, 25.

A coupling member 31 is connected to the other end of the movable member 24. The coupling member 31 is coupled to the rotating member 21 of the operating lever 17 at a position distanced from the rotation axis of the rotating member 21. When the operating lever 17 is pulled out to move from the retract position to the pulled-out position against the driving force of the torsion coil spring 23, the rotating member 21 rotates around the support shaft 22. The rotation of the rotating member 21 enables the movement of the movable member 24 in the first direction 26.

The movable member 24 defines a pair of guiding rails 32, 32 extending in the longitudinal direction of the movable member 24. The guiding rails 32, 32 are designed to extend along parallel lines. A pair of recesses 33, 33 are defined in each guiding rail 32. A flat surface, namely a first receiving surface 34, is defined on the top surface of the guiding rail 32 in the individual recess 33. Another flat surface, namely a second receiving surface 35, is defined on the top surface of the guiding rail 32 at a position remoter from the operating lever 17 than the recess 33. The second receiving surface 35 is defined at a position closer to the cover 12b than the first receiving surface 34. Here, the first and second receiving surfaces 34, 35 are set parallel with each other.

An inclined surface 36 is connected to the rear end of the first receiving surface 34. The rear end of the inclined surface 36 is connected to the second receiving surface 35. The inclined surface 36 thus connects the second receiving surface 35 to the corresponding first receiving surface 34. The inclined surface 36 gets closer to the cover 12b as the position gets remoter from the operating lever 17. A depression 37 is formed in the second receiving surface 35 at a position adjacent to the rear end of the inclined surface 36. The depression 37 defines a semicylindrical space extending in the direction perpendicular to the guiding rail 32, for example. Here, the guiding rails 32, 32 have the identical shape.

The lifting members 16 are formed in the shape of a column standing upright in the direction intersecting with the surface of the cover 12b. A pair of protrusions 38, 38 is formed at the lower end of the individual lifting member 16 to extend in the opposite directions from the lifting member 16. The protrusions 38, 38 protrude in the direction perpendicular to the guiding rail 32 of the movable member 24. The protrusions 38, 38 may be formed in a cylindrical shape, for example. A connecting piece 39 connects the lifting members 16, 16 with each other. The connecting piece 39 is received in a space between the guiding rails 32, 32.

The individual lifting member 16 is received on the guiding rail 32, 32 at the protrusions 38, 38. When the movable member 24 moves in the first direction 26 or in the second direction 27 based on the operation of the operating lever 17 or the compressive force of the compressive coil spring 28, the protrusions 38, 38 of the lifting members 16 slide on the guiding rails 32, 32, as described later in detail. The lifting members 16 thus move upward in the vertical direction intersecting with the surface of the cover 12b. Here, the first receiving surface 34, the inclined surface 36 and the second receiving surface 35 in combination establish the movement path of the protrusions 38, 38 of the lifting member 16. The movement of the lifting members 16, 16 is in this manner guided along the guiding rails 32, 32.

Figure 3:
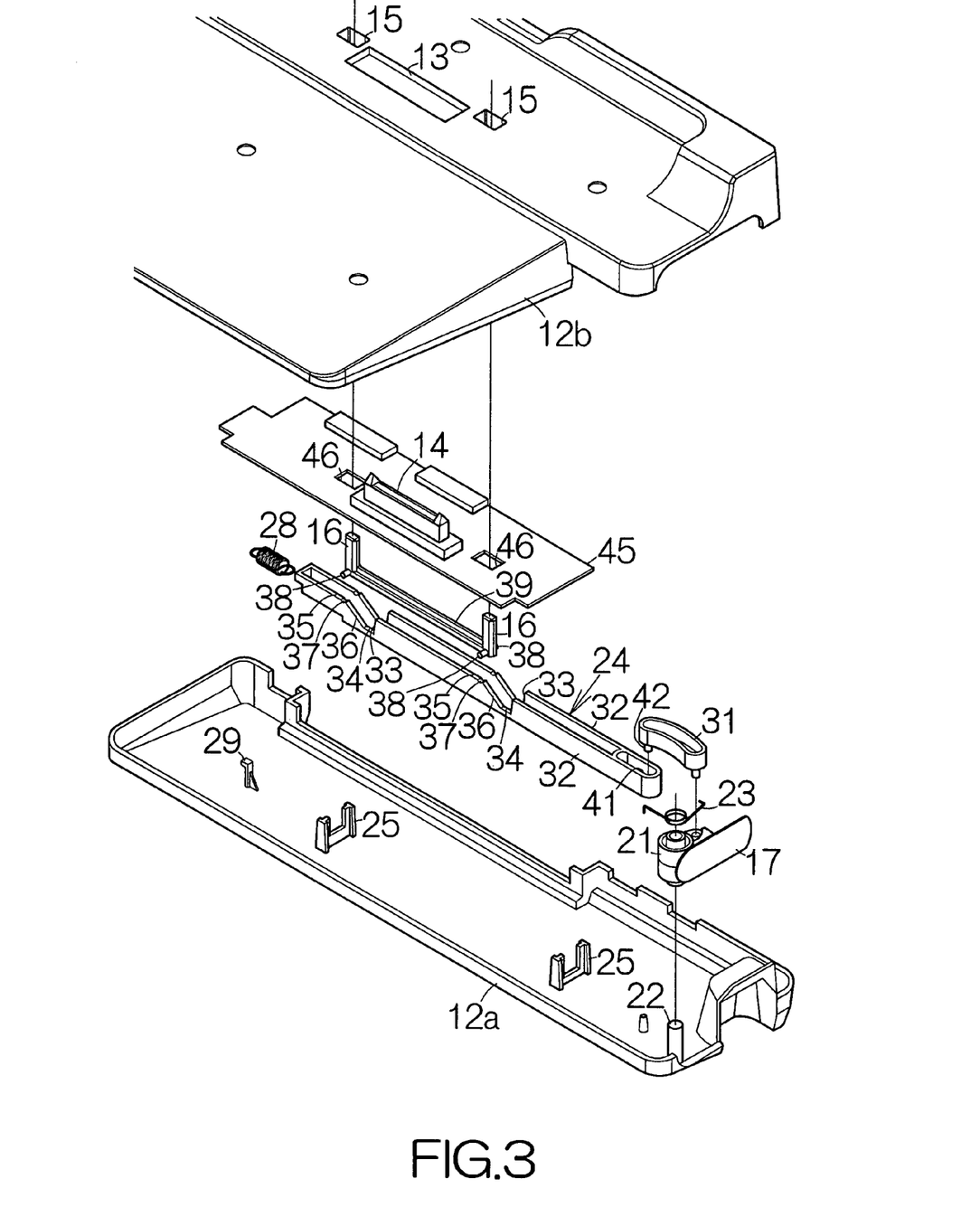
FIG. 3 is an exploded partial view schematically illustrating the inner structure of the extension unit.

Referring also to FIG. 3, a guiding groove 41 is defined at one end of the movable member 24. A cylindrical pin 42 is received in the guiding groove 41, for example. The cylindrical pin 42 protrudes from the bottom of the coupling member 31. The guiding groove 41 has a predetermined size defined in the first and second directions 26, 27. When the movable member 24 moves farthest in the second direction 27, the pin 42 is engaged with one end of the guiding groove 41. In this case, the pin 42 is positioned based on the operating lever 17 set at the retract position. When the movable member 24 moves farthest in the first direction 26, the pin 42 is allowed to move in the second direction 27 from one end to the other end in the guiding groove 41 as long as the operating lever 17 is set at the retract position. When the operating lever 17 is pulled out to the pulled-out position, the movable member 24 is allowed to move in the first direction 26 based on the engagement of the pin 42 with one end of the guiding groove 41. A "clearance" is thus established in the guiding groove 41. This "clearance" enables the movement of the operating lever 17 from the pulled-out position to the retract position.

As shown in FIG. 3, a printed circuit board 45 is fixed on the base 12a. A screw may be screwed into a boss standing upright from the base 12a to fix the printed circuit board 45, for example. The connector 14 is mounted on the front surface of the printed circuit board 45. The printed circuit board 45 is located between the movable member 24 and the cover 12b. Wiring patterns extend over the front and back surfaces of the printed circuit board 45, respectively.

Through holes 46, 46 are formed in the printed circuit board 45. The through holes 46, 46 penetrate from the front surface to the back surface of the printed circuit board 45. The lifting members 16, 16 are respectively received in the through holes 46, 46. The lifting member 16 is thus guided along the inner surface of the through hole 46. The through holes 46, 46 serve to restrict the movement of the lifting members 16, 16 in the first and second directions 26, 27 regardless of the movement of the movable member 24 in the first and second directions 26, 27.

Figure 4:
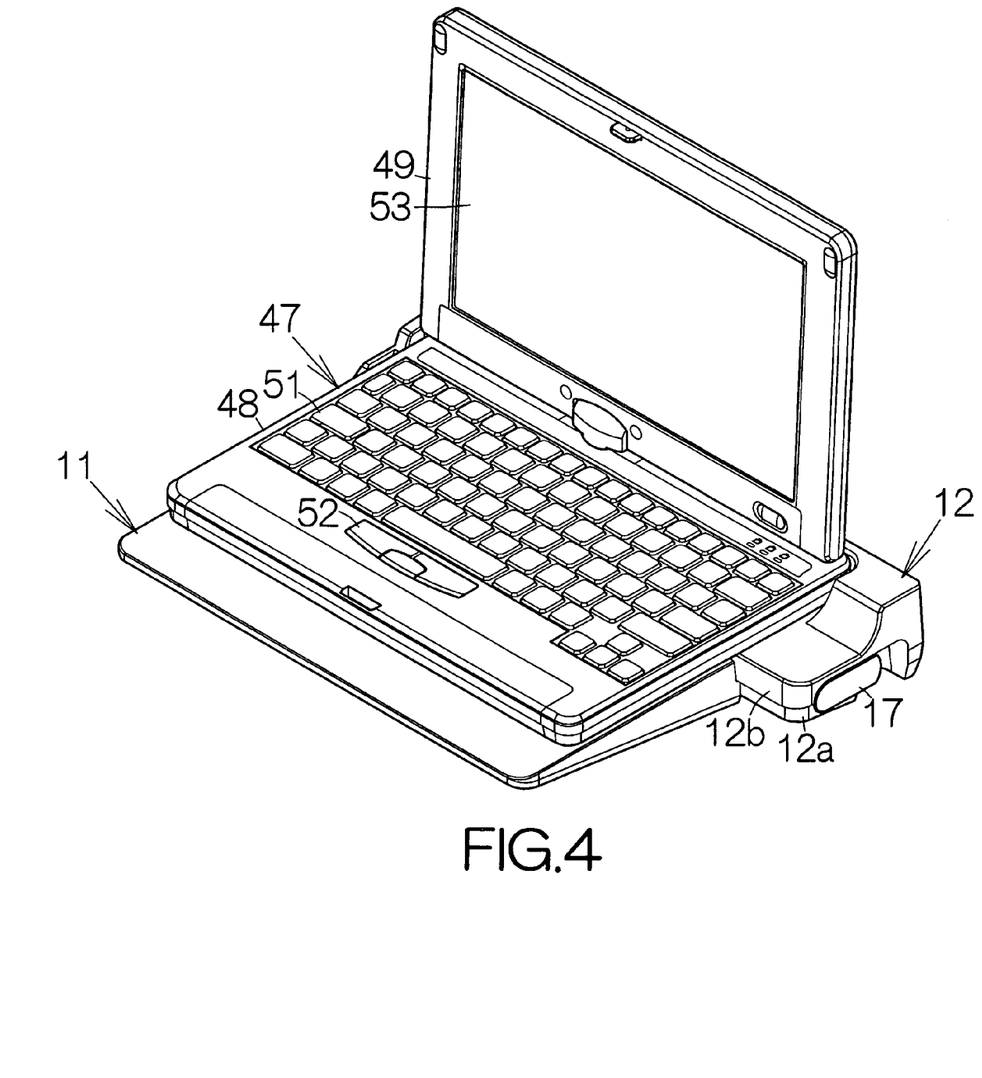
FIG. 4 is a perspective view schematically illustrating the extension unit receiving an electronic apparatus or notebook personal computer.

The extension unit 11 is designed to receive an electronic apparatus such as a notebook personal computer 47, as shown in FIG. 4, for example. Here, the notebook personal computer 47 includes a main apparatus 48 and a display unit 49 coupled to the main apparatus 48. A connector, not shown, is disposed in the bottom of the main apparatus 48. When the main apparatus 48 of the notebook personal computer 47 is mounted on the extension unit 11, the connector of the notebook personal computer 47 is connected to the connector 14 of the extension unit 11. Connection is in this manner established between the notebook personal computer 47 and the extension unit 11. The notebook personal computer 47 and the extension unit 11 in combination establish an electronic apparatus system according to the present invention.

A motherboard is incorporated in the main apparatus 48, for example. Electronic circuit elements such as a central processing unit (CPU), a random access memory (RAM), a nonvolatile memory, and the like, are mounted on the motherboard, for example. A software program such as a basic input/output system (BIOS) is stored in the nonvolatile memory, for example. The CPU is designed to execute various kinds of processing based on an operation system (OS) and/or application software, which are temporarily stored in the RAM, for example. The OS and the application software may be stored in a large capacity storage such as a hard disk drive, HDD, enclosed in the main apparatus 48.

Input devices such as a keyboard 51 and an input keypad 52 are embedded in the front surface of the main apparatus 48. A user is invited to manipulate the keyboard 51 and/or the input keypad 52 to input various kinds of data and/or instructions to the CPU. The display unit 49 includes a flat display panel such as a liquid crystal display (LCD) panel 53, for example. The display unit 49 allows exposure of the screen of the LCD panel 53. Texts and graphics are displayed on the screen of the LCD panel 53 based on the processing of the CPU.

Figure 5:
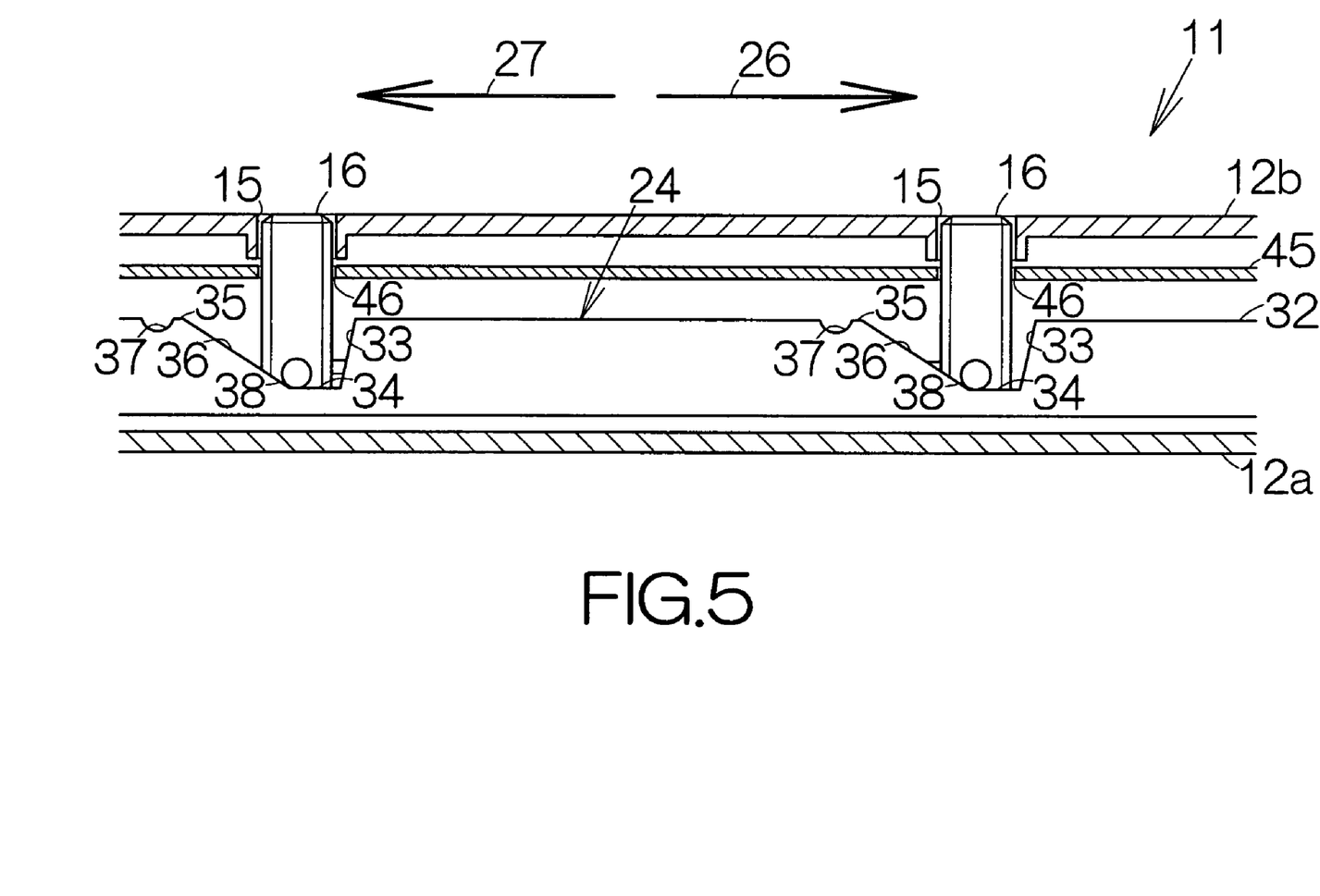
FIG. 5 is an enlarged partial sectional view schematically illustrating a movable member set at a first position.

Next, assume that the notebook personal computer 47 is to be mounted on the extension unit 11. As shown in FIG. 2, the operating lever 17 is set at the retract position with the assistance of the torsion coil spring 23 in the extension unit 11. The compressive coil spring 28 drives the movable member 24 to a predetermined first position. The pin 42 of the coupling member 31 is engaged with one end of the guiding groove 41 of the movable member 24. Referring also to FIG. 5, the protrusions 38, 38 of the individual lifting member 16 are received on the first receiving surfaces 34, 34 within the recesses 33, 33, respectively. The lifting members 16, 16 are thus set at the enclosed positions. The upper ends of the lifting members 16, 16 retract from the front surface of the cover 12b.

When the notebook personal computer 47 is received on the front surface of the cover 12b, the connector of the notebook personal computer 47 is connected to the connector 14 of the extension unit 11. Electric current is thus allowed to run from the notebook personal computer 47 to the extension unit 11. The electric current runs back to the notebook personal computer 11 after running through the printed circuit board 45. The BIOS of the notebook personal computer 47 detects the circulation of the electric current. The BIOS notifies the CPU of the detection of the connection. The CPU in this manner recognizes the connection to the extension unit 11. The CPU operates to set the setting of the application software to the setting for connection to the extension unit 11. The connection is in this manner established between the notebook personal computer 47 and the extension unit 11. Peripheral devices can be connected to the connectors at the rear end of the enclosure 12. The user of the notebook personal computer 47 is allowed to utilize various kinds of peripheral devices.

Figure 6:
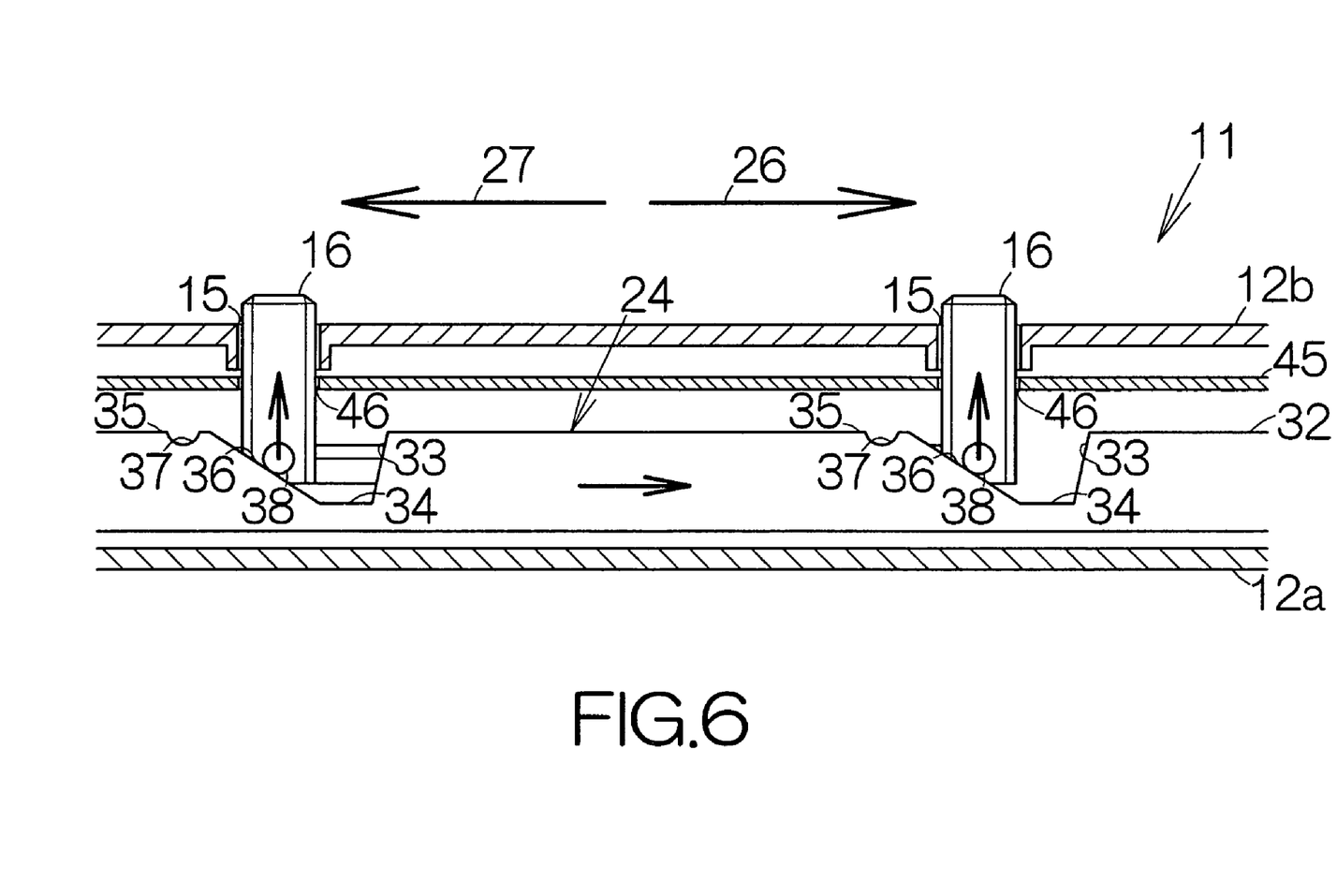
FIG. 6 is an enlarged partial sectional view schematically illustrating the movable member moving from the first position toward a second position.

Next, assume that the notebook personal computer 47 is demounted from the extension unit 11. When the service of the extension unit 11 has been completed, the user is invited to pull out the operating lever 17 from the retract position toward the pulled-out position with his finger. The pin 42 of the coupling member 31 is engaged with one end of the guiding groove 41 of the movable member 41, so that the movable member 41 moves in the first direction 26. Since the lifting members 16, 16 are received on the inner surfaces of the through holes 46, 46 of the printed circuit board 45, the lifting members 16, 16 are restrained from moving in the first direction. The movement of the movable member 24 thus causes the protrusions 38, 38 of the individual lifting member 16 to move upward from the corresponding first receiving surfaces 34, 34 along the corresponding inclined surfaces 36, 36, as shown in FIG. 6. The upper end of the lifting member 16 gradually protrudes out of the front surface of the cover 12b as the protrusions 38, 38 climb the inclined surfaces 36, 36.

Figure 7:
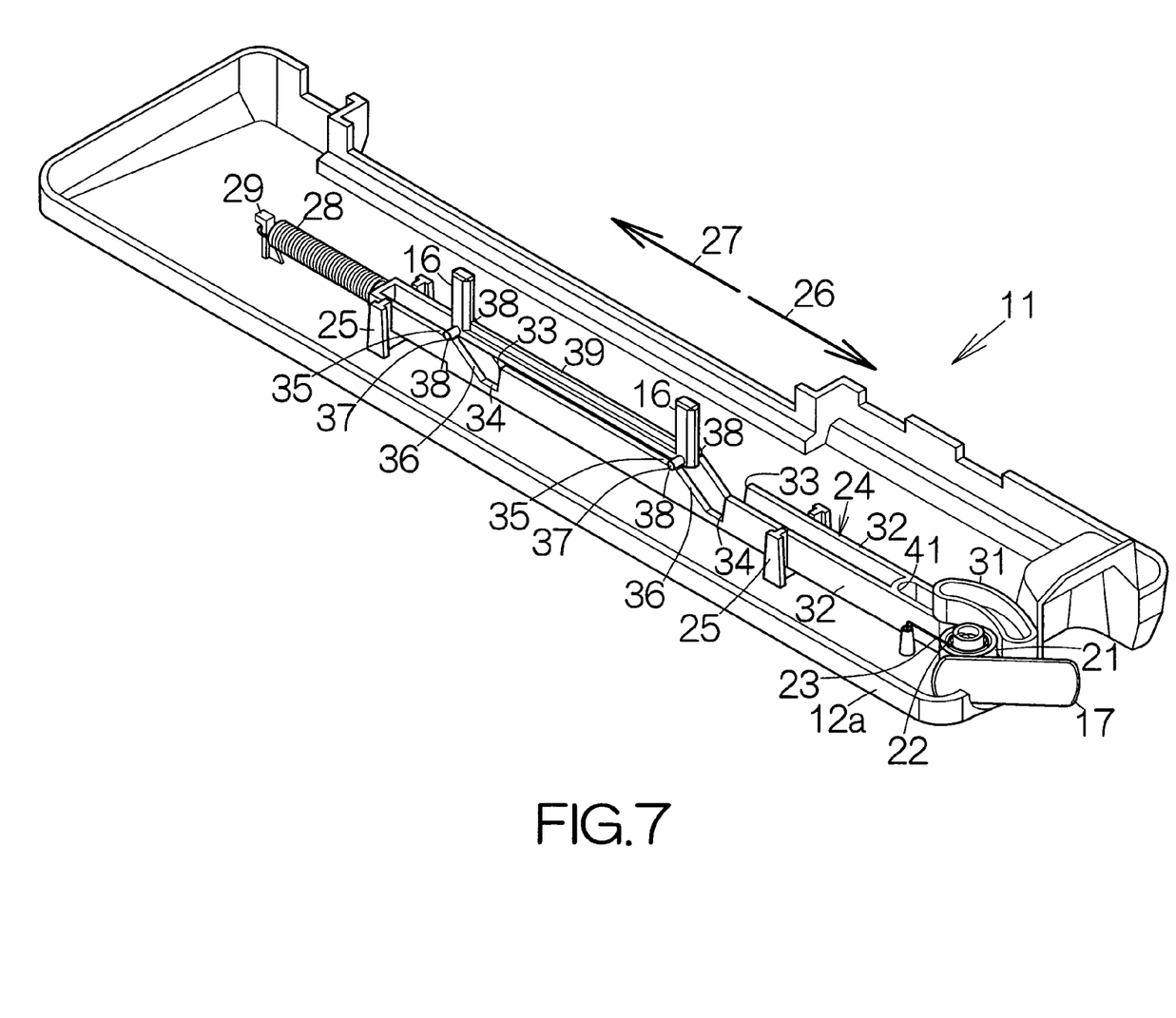
FIG. 7 is a perspective view schematically illustrating the movable member set at the second position.
Figure 8:
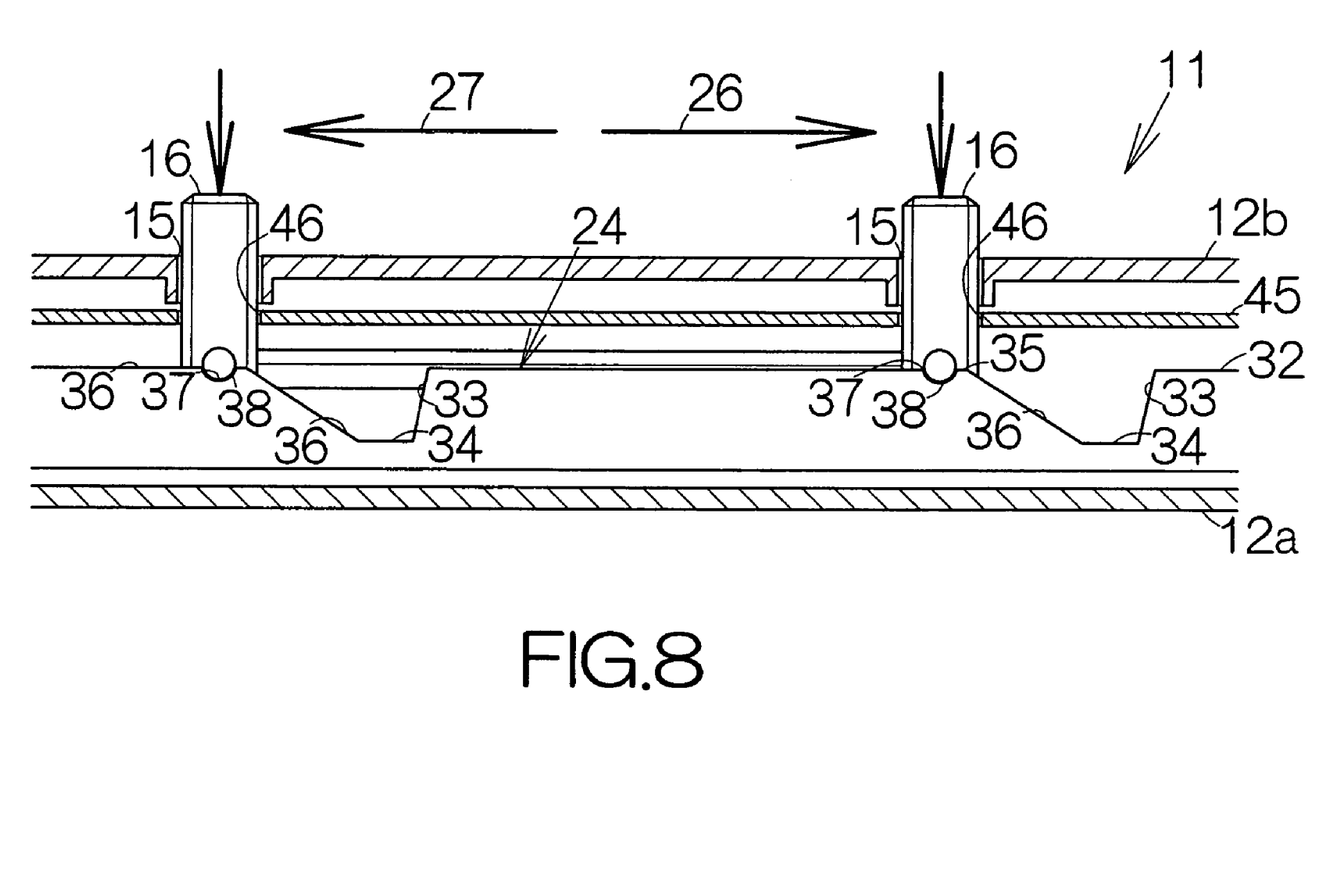
FIG. 8 is an enlarged partial sectional view schematically illustrating the movable member set at the second position.

When the operating lever 17 is further moves toward the pulled-out position, the protrusions 38, 38 of the individual lifting member 16 reach the corresponding second receiving surfaces 35, 35 from the inclined surfaces 26, 26 based on the movement of the movable member 24 in the first direction 26, respectively. As shown in FIG. 7, when the operating lever 17 has finally reached the pulled-out position, the movable member 24 reaches a second position. The protrusions 38, 38 of the individual lifting member 16 are received in the corresponding depressions 37, 37, respectively. The lifting members 16, 16 are in this manner set at the protruding position. The upper ends of the lifting members 16, 16 are thus positioned at the same level above the front surface of the cover 12b, as shown in FIG. 8. The upper ends of the lifting members 16, 16 urge the bottom of the notebook personal computer 47 upward. This results in disconnection between the connector of the notebook personal computer 47 and the connector 14 of the extension unit 11.

The disconnection between the connectors leads to cutoff of circulation of the electric current between the notebook personal computer 47 and the extension unit 11. The BIOS of the notebook personal computer 47 detects the cutoff of circulation of the electric current. The BIOS notifies the OS of the detection of the disconnection. The CPU recognizes the disconnection to the extension unit 11. The CPU operates to switch over the setting for the connection to the extension unit 11 to the setting for the disconnection to the extension unit 11. The extension unit 11 has in this manner been completely disconnected from the notebook personal computer 47.

The bottom of the notebook personal computer 47 is received on the upper ends of the lifting members 16, 16. The weight of the notebook personal computer 47 acts on the lifting members 16, 16. The weight of the notebook personal computer 47 serves to urge the protrusions 38, 38 of the individual lifting member 16 against the corresponding second receiving surfaces 36, 36, namely the depressions 37, 37 in the direction of the gravity. The weight of the notebook personal computer 47 is applied to the movable member 24 through the lifting members 16, 16. The weight of the notebook personal computer 47 serves to keep the movable member 24 at the second position irrespective of the elastic force of the compressive coil spring 28. The lifting members 16, 16 are kept at the protruding positions. The disconnection is thus maintained between the connector of the notebook personal computer 47 and the connector 14 of the extension unit 11.

Figure 9:
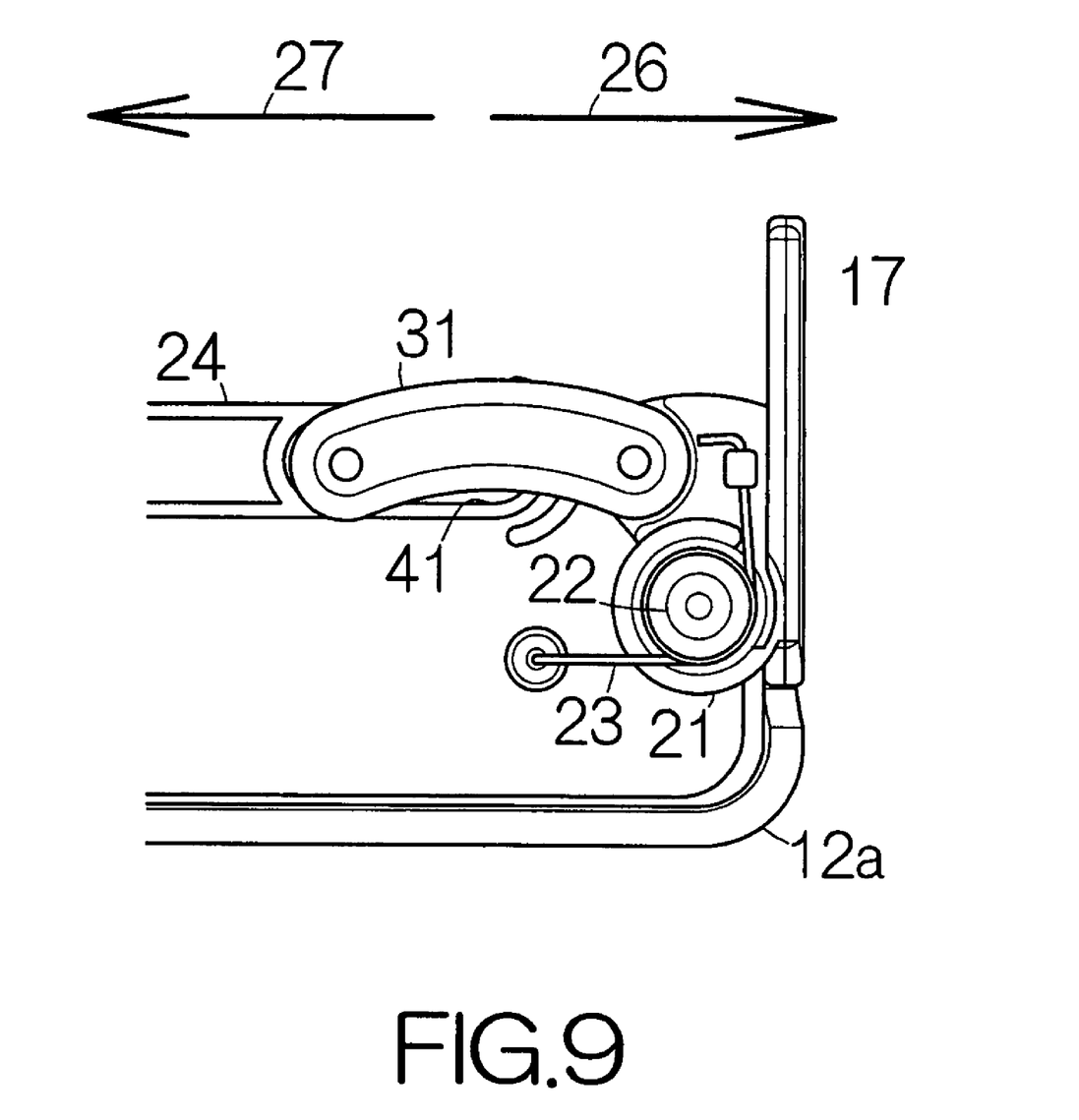
FIG. 9 is an enlarged partial plan view schematically illustrating an operating lever set at a retract position while the movable member is kept at the second position.
Figure 10:
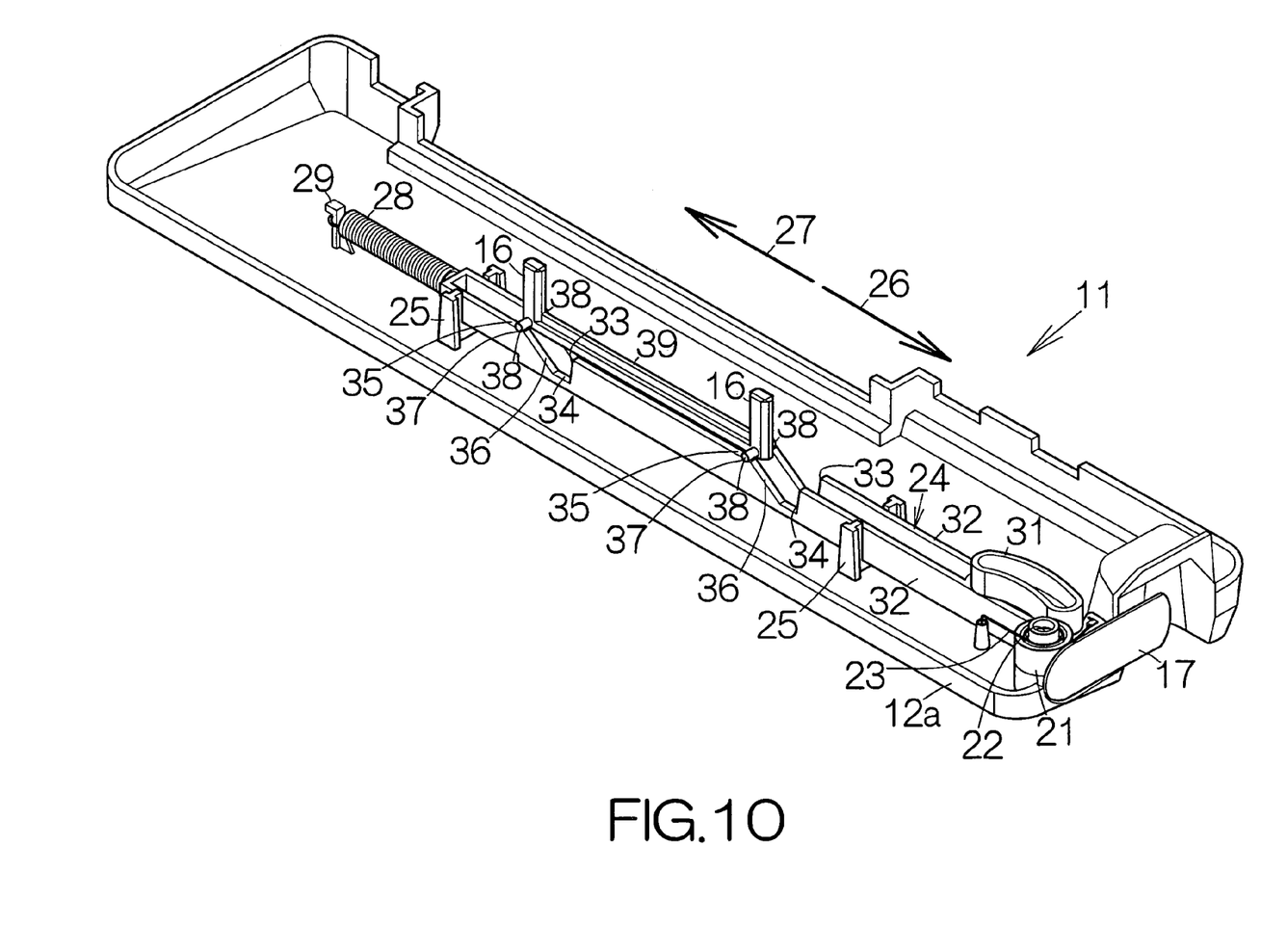
FIG. 10 is a perspective view schematically illustrating the operating lever set at the retract position while the movable member is kept at the second position.

In this case, the pin 42 of the coupling member 31 is allowed to move in the guiding groove 41 of the movable member 24. When the finger of the user is disengaged from the operating lever 17, for example, the driving force of the torsion coil spring 23 forces the operating lever 17 to swing from the pulled-out position to the retract position, as shown in FIG. 9. The operating lever 17 thus automatically swings from the pulled-out position to the retract position. The swinging movement of the operating lever 17 results in the movement of the pin 42 of the coupling member 31 in the second direction 27 within the guiding groove 41 from one end to the other end of the guiding groove 41. As shown in FIG. 10, the operating lever 17 is set at the retract position while the movable member 24 is kept at the second position. The lifting members 16, 16 are kept at the protruding positions. The disconnection is thus maintained between the connector of the notebook personal computer 47 and the connector 14 of the extension unit 11.

Figure 11:
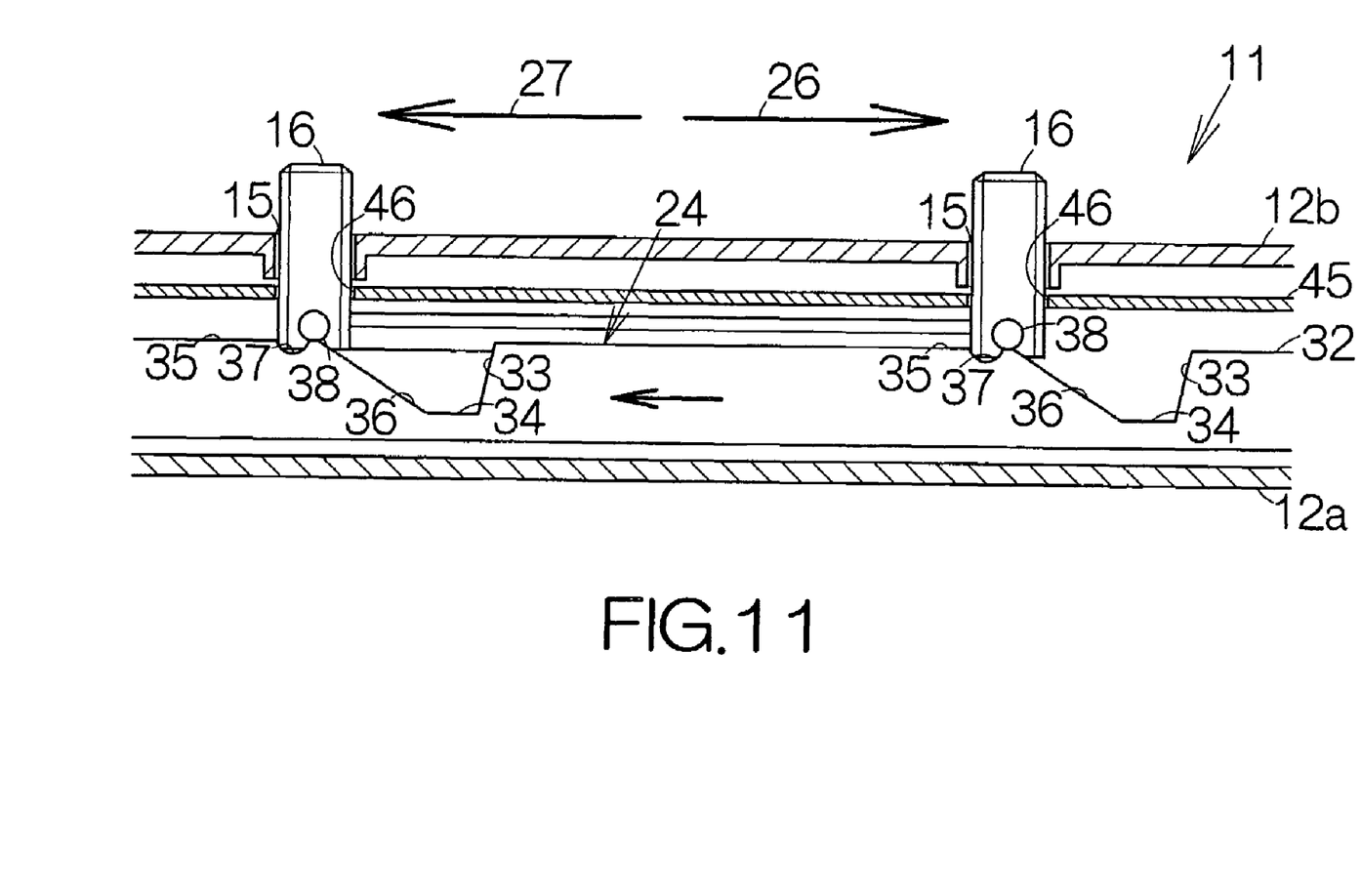
FIG. 11 is an enlarged partial sectional view schematically illustrating the movable member moving from the second position toward the first position.

When the notebook personal computer 47 is then lifted up, the lifting members 16, 16 are released from the weight of the notebook personal computer 47. The movable member 24 thus moves from the second position to the first position based on the elastic force of the compressive coil spring 28. As shown in FIG. 11, the protrusions 37, 37 of the individual lifting member 16 move out of the depressions 37, 37 to the second receiving surfaces 35, 35, respectively. The protrusions 38, 38 of the individual lifting member 16 then move along the second receiving surfaces 35, 35 and the inclined surfaces 36, 36 in sequence to get to the first receiving surfaces 34, 34, respectively. When the movable member 24 returns to the first position, the protrusions 38, 38 of the individual lifting member 16 are received on the first receiving surfaces 34, 34, respectively. The lifting members 16, 16 are set at the enclosed positions in this manner. The upper ends of the lifting members 16, 16 retract from the surface of the cover 12b.

The extension unit 11 allows the movable member 24 to stay at the second position when the disconnection is established between the connector of the notebook personal computer 47 and the connector 14 of the extension unit 11. The lifting members 16, 16 are set at the protruding positions. The lifting members 16, 16 serve to maintain the disconnection between the connectors. The guiding groove 41 allows the movement of the coupling member 31 in the second direction 27. The operating lever 17 is allowed to move from the pulled-out position to the retract position based on the movement of the coupling member 31. The operating lever 17 reaches the retract position while the disconnection is maintained between the connectors. When the notebook personal computer 47 is lifted off, for example, the power cord of the notebook personal computer 47 is reliably prevented from engagement with the operating lever 17. This serves to reliably prevent the extension unit 11 from a fall resulting from engagement of the power cord with the operating lever 17. The extension unit 11 can reliably be prevented from getting damaged.

In addition, the bottom of the notebook personal computer 47 is received on the lifting members 16, 16 when the disconnection has been established between the connectors. The weight of the notebook personal computer 47 acts on the lifting members 16, 16. The weight of the notebook personal computer 47 is applied to the movable member 24 through the lifting members 16, 16. Even when the operating lever 17 is set at the retract position, the movable member 24 can be kept at the second position irrespective of the compressive elastic force of the compressive coil spring 28. In particular, since the protrusions 38, 38 of the individual lifting member 16 are received in the depressions 37, 37 of the movable member 24, respectively, the movable member 24 can reliably be kept at the second position. As long as the movable member 24 is kept at the second position in this manner, the upper ends of the lifting members 16, 16 keeps receiving the notebook personal computer 47. The disconnection can thus be maintained between the connector of the notebook personal computer 27 and the connector 14 of the extension unit 11. This results in a reliable prevention of an accidental connection between the connectors after the disconnection.

What is claimed is:

1. An extension unit for an electronic apparatus, comprising:
   an enclosure defining a surface receiving the electronic apparatus;
   a connector placed in the surface of the enclosure for connection to the electronic apparatus;
   an operating body coupled to the enclosure for relative movement between a retract position and a pulled-out position, the operating body retracting inside the enclosure when the operating body is set at the retract position, the operating body pulled out of the enclosure when the operating body is set at the pulled-out position; and
   an interlocking mechanism enabling withdrawal of a lifting member into the enclosure when the operating body is set at the retract position, the interlocking mechanism enabling protrusion of the lifting member out of the surface of the enclosure to urge the electronic apparatus upward based on movement of the operating body from the retract position toward the pulled-out position, wherein
   the interlocking mechanism allows movement of the operating body from the pulled-out position to the retract position while keeping the lifting member protruding out of the surface of the enclosure.

2. The extension unit according to claim 1, wherein the interlocking mechanism includes a movable member coupled to the operating body, the movable member designed to move from a first position toward a second position in response to the movement of the operating body from the retract position toward the pulled-out position, wherein the movable member allows the movement of the operating body from the pulled-out position toward the retract position while the movable member is kept at the second position.

3. The extension unit according to claim 2, further comprising a coupling member coupled to the operating body at a position distanced from a rotation axis of the operating body, the coupling member designed to hold a pin movable within a guiding groove defined in one end of the movable member.

4. The extension unit according to claim 2, further comprising:

a flat surface defined on the movable member, the flat surface receiving movement of the lifting member in a direction of gravity when the movable member is set at the second position; and an elastic member exhibiting a driving force enabling movement of the movable member from the second position to the first position, wherein the movable member is kept at the second position against the driving force of the elastic member by receiving a weight of the electronic apparatus through the lifting member.

5. The extension unit according to claim 1, further comprising a driving source exhibiting a driving force enabling the movement of the operating body from the pulled-out position toward the retract position.

6. An electronic apparatus system comprising the extension unit according to claim 1 and the electronic apparatus.

* * * * *